No. 870,059. PATENTED NOV. 5, 1907.
J. STERNAMAN, Jr.
SCREW.
APPLICATION FILED JAN. 15, 1906.
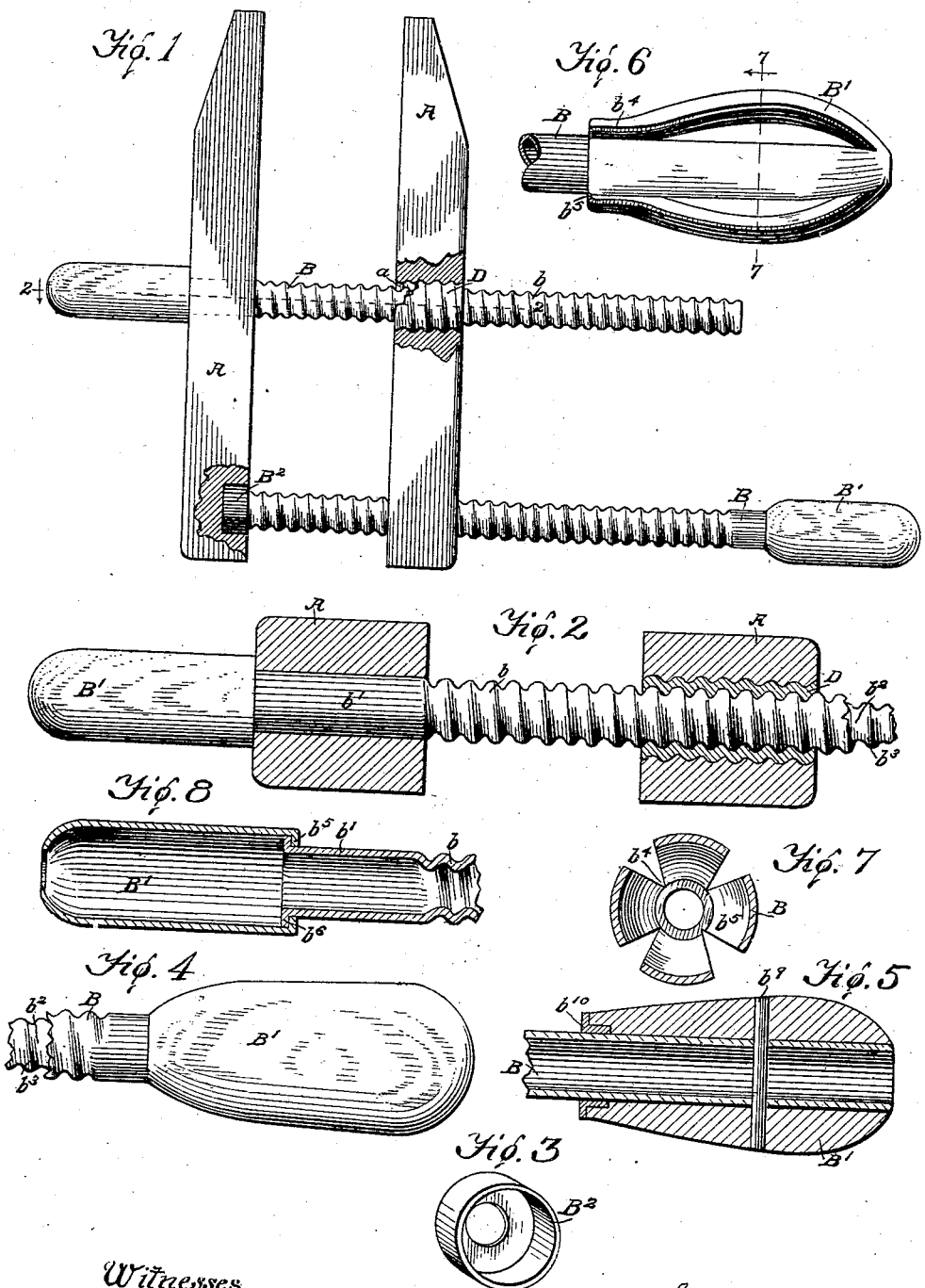
Witnesses
E. H. Lichtenberg
Clara McKee
Inventor
John Sternaman Jr.
by Atty N. DuBois.

UNITED STATES PATENT OFFICE.

JOHN STERNAMAN, JR., OF SPRINGFIELD, ILLINOIS.

SCREW.

No. 870,059.  Specification of Letters Patent.  Patented Nov. 5, 1907.

Application filed January 15, 1906. Serial No. 296,212.

*To all whom it may concern:*

Be it known that I, JOHN STERNAMAN, Jr., a citizen of the United States, residing at Springfield, in the county of Sangamon and State of Illinois, have invented certain new and useful Improvements in Screws, of which the following is such a full, clear, and exact description as will enable others skilled in the art to which it appertains to make and use my said invention.
My invention relates to tubular metal screws usable for any purpose for which such screws are suitable.

The purposes of my invention are to provide a screw which shall be light and strong and flexible to a degree depending upon the metal of which it is made.
In the drawings I have shown and will hereinafter describe a screw adapted for use with a screw clamp such as is commonly used by joiners and pattern makers.

Another purpose of my invention is to provide a screw with a suitable handle which may be integral therewith or may be connected with the body of the screw as hereinafter explained and to provide a screw threaded bushing usable with the screw.

With these ends in view my invention consists in the novel features of construction and combinations of parts shown in the annexed drawings to which reference is hereby made and hereinafter particularly described and finally recited in the claim.

Referring to the drawings in which similar reference letters designate like parts in the several views; Figure 1 is a top plan of a screw-clamp embodying my invention; Fig. 2 is an enlarged partial vertical section on the line 2.2 of Fig. 1. In Fig. 2, the jaws of the clamp and the bushing are shown in section and the screw proper is shown in elevation; Fig. 3 is a perspective view of a thimble adapted to fit in one of the jaws and receive the thrust of one of the screws against the jaw, when the screws are used on a screw clamp or the like. Fig. 4 is an enlarged view of a screw having a wood handle and integral with the handle a wood reinforcement extending through the tubular metal screw; Fig. 5 is a longitudinal section of a part of a screw provided with a handle connected with the body of the screw, the handle being of wood, metal or other suitable material; Fig. 6 is a plan of part of a screw in which the handle is integral with the body of the screw; Fig. 7 is a transverse section on the line 7.7 of Fig. 6; Fig. 8 is a sectional view of a screw having a hollow handle secured on the body of the screw.
The jaws A of the screw-clamp are preferably of wood of the usual well known form. The body B of the screw is preferably made of steel tube of suitable thickness for the purpose for which the screw is intended. Screw threads $b$ are formed in the metal of the tube alike inside and outside of the tube. A part $b^1$ of the tube is without threads and fits loosely in a hole in one of the jaws A. Tubular bushings D are formed from metal tubes threaded alike inside and outside and are cut off to form bushings of suitable length. The external screws $b$ of the tube B fits the female screw of the bushing D. The bushings D are screwed into and are held firmly in transverse holes $a$ extending through the jaws A. The handle $B^1$ is preferably of wood and has an integral stem $b^2$ provided with screw threads $b^3$ which match the threads on the inside of the tube B and when the parts are assembled the stem $b^2$ completely fills the tube and reinforces it so as to greatly increase the strength of the screw without unduly increasing its weight.

Occasion may arise in which it is desirable to have a metal handle either integral with or connected with the body of the screw instead of a wooden handle detachably connected with the screw such as I have described. The handle integral with the tubular body of the screw is preferably formed by cutting longitudinal slits $b^4$ through the wall of the tube and then pressing the end of the tube to expand the several members separated by the slits so as to form an oval handle having longitudinal slits and also having a shoulder $b^5$ at the juncture of the handle with the body of the tube as clearly shown in Figs. 6 and 7. If for any reason it is desired to use a metal handle connected with the body of the tube a flange $b^6$ may be formed on one end of the tube and the hollow metal handle $B^1$ may be formed to fit around the flange $b^6$ and the end of the handle may be given the form of a shoulder $b^5$. When the handle is in place on the tube it may be brazed or otherwise suitably secured on the tube. In Fig. 5 the body of the tube B is shown as extending through the handle $B^1$ and a rivet $b^9$ or other suitable securing device secures the handle on the tube. A ferrule $b^{10}$ at one end of the handle forms a shoulder to receive the end of the screw. The thimble $B^2$ fits in a hole extending part way through the jaw A and the end of the screw fits loosely in the thimble.

Having fully described my invention what I claim as new and desire to secure by Letters Patent is:

A tubular screw-body threaded alike outside and inside, in combination with a reinforcement having a handle provided with a shoulder.

In witness whereof I have hereunto subscribed my name at Springfield Illinois this 27th day of December 1905.

JOHN STERNAMAN, JR.

Witnesses:
JOHN A. BOYCE,
MARGARET MCDONALD.